(12) United States Patent
Vetrovec et al.

(10) Patent No.: US 7,477,674 B2
(45) Date of Patent: Jan. 13, 2009

(54) HIGH-GAIN SOLID-STATE LASER

(75) Inventors: Jan Vetrovec, Larkspur, CO (US); Roy Clark, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 142 days.

(21) Appl. No.: 11/164,185

(22) Filed: Nov. 14, 2005

(65) Prior Publication Data

US 2007/0110116 A1 May 17, 2007

(51) Int. Cl.
*H01S 3/08* (2006.01)
(52) U.S. Cl. ........................ 372/103; 372/108
(58) Field of Classification Search .................. 372/66, 372/67, 36, 103, 108
See application file for complete search history.

(56) References Cited

U.S. PATENT DOCUMENTS

| | | | |
|---|---|---|---|
| 4,849,036 A | 7/1989 | Powell et al. | |
| 5,050,181 A * | 9/1991 | Gekat | 372/69 |
| 5,335,237 A | 8/1994 | Zapata | |
| 5,441,803 A | 8/1995 | Meissner | |
| 5,553,088 A | 9/1996 | Brauch et al. | |
| 5,563,899 A | 10/1996 | Meissner et al. | |
| 5,846,638 A | 12/1998 | Meissner | |
| 6,094,297 A * | 7/2000 | Injeyan et al. | 359/345 |
| 6,339,605 B1 | 1/2002 | Vetrovec | |
| 6,418,156 B1 * | 7/2002 | Peressini | 372/66 |
| 6,603,793 B2 | 8/2003 | Vetrovec | |
| 6,625,193 B2 | 9/2003 | Vetrovec | |
| 6,888,872 B2 | 5/2005 | Vetrovec | |
| 6,904,069 B2 | 6/2005 | Honea et al. | |
| 2002/0110164 A1* | 8/2002 | Vetrovec | 372/36 |
| 2003/0118073 A1* | 6/2003 | Rockwell | 372/70 |
| 2004/0233960 A1 | 11/2004 | Vetrovec | |
| 2005/0058173 A1 | 3/2005 | Vetrovec | |

OTHER PUBLICATIONS

Beach, R.J., et al., High-Average-Power Diode-Pumped Yb: YAG Lasers, U.S. Department of Energy, Lawrence Livermore National Laboratory, Oct. 1, 1999.

* cited by examiner

*Primary Examiner*—Minsun Harvey
*Assistant Examiner*—Patrick Stafford
(74) *Attorney, Agent, or Firm*—Charles L. Moore; Moore & Van Allen, PLLC

(57) ABSTRACT

A laser gain material module may include a lasing portion and a perimetral portion. The perimetral portion may be formed in a predetermined shape to substantially prevent any spontaneously emitted photons created in the lasing portion and entering the perimetral portion from returning to the lasing portion.

30 Claims, 5 Drawing Sheets

HIGH-GAIN SOLID-STATE LASER

BACKGROUND OF THE INVENTION

The present invention relates to lasers and more particularly to a high-gain solid-state laser or the like.

In a solid-state laser or the like, high gain is critical to achieving operation at high-average power in a compact package, such as about a 50-100 kilowatt-class or higher solid-state laser. One challenge to developing high-average power solid-state lasers is a limitation on laser gain imposed by losses caused by amplified spontaneous emission (ASE). ASE is a phenomenon wherein spontaneously emitted photons traverse the laser gain medium and are amplified before they may exit the gain medium. The favorable condition for ASE is a combination of high gain and a long path for the spontaneously emitted photons. ASE may depopulate the upper energy level in an excited laser gain medium, thereby reducing laser gain, robbing the laser of extractable power and limiting the laser's efficiency. In addition, power lost to ASE may be deposited as heat in various parts of the laser system, causing thermal stress and misalignment of other components, optical path variations and instability, reduction of beam quality and the like. ASE losses and concomitant heating can amount to several kilowatts of lost power. In pulsed lasers ASE losses may delay the laser pulse startup thereby wasting power in excited laser states. Furthermore, reflection of ASE photons at gain medium boundaries may provide feedback for parasitic oscillations that aggravate the loss of laser power. If unchecked, ASE may become large enough to deplete the upper level inversion in high-gain laser amplifiers.

BRIEF SUMMARY OF THE INVENTION

In accordance with an embodiment of the present invention, a laser gain material module may include a lasing portion and a perimetral portion. The perimetral portion may be formed in a predetermined shape to substantially prevent spontaneously emitted photons created in the lasing portion and entering the perimetral portion from returning to the lasing portion.

In accordance with another embodiment of the present invention, a laser gain material module may include a lasing portion and a pair of perimetral portions disposed on opposite lateral sides of the lasing portion. Each of the perimetral portions may include an outer perimetral edge and a predetermined shape. The predetermined shape may cause any spontaneously emitted photons in the perimetral portion to be incident upon the outer perimetral edge at an angle to substantially prevent the photon from being reflected back by a surface of the outer perimetral edge.

In accordance with another embodiment of the present invention, a laser system may include a laser gain material module. The laser gain material module may include a lasing portion and a perimetral portion. The perimetral portion may be formed in a predetermined shape to substantially prevent any spontaneously emitted photons created in the lasing portion and entering the perimetral portion from returning to the lasing portion. The laser system may also include a source to direct optical pump radiation into the lasing portion.

In accordance with another embodiment of the present invention, a method to substantially reduce amplified spontaneous emission may include providing a perimetral portion formed in a predetermined shape to substantially prevent any spontaneously emitted photons entering the perimetral portion from returning to or entering a lasing portion.

In accordance with another embodiment of the present invention, a method to substantially reduce amplified spontaneous emission may include disposing a perimetral portion on opposite sides of a lasing portion. Each perimetral portion may include an outer perimetral edge and a predetermined shape. The predetermined shape may cause any spontaneously emitted photons in the perimetral portion to be incident upon the outer perimetral edge at an angle to substantially prevent the photon from being reflected back by a surface of the outer perimetral edge.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
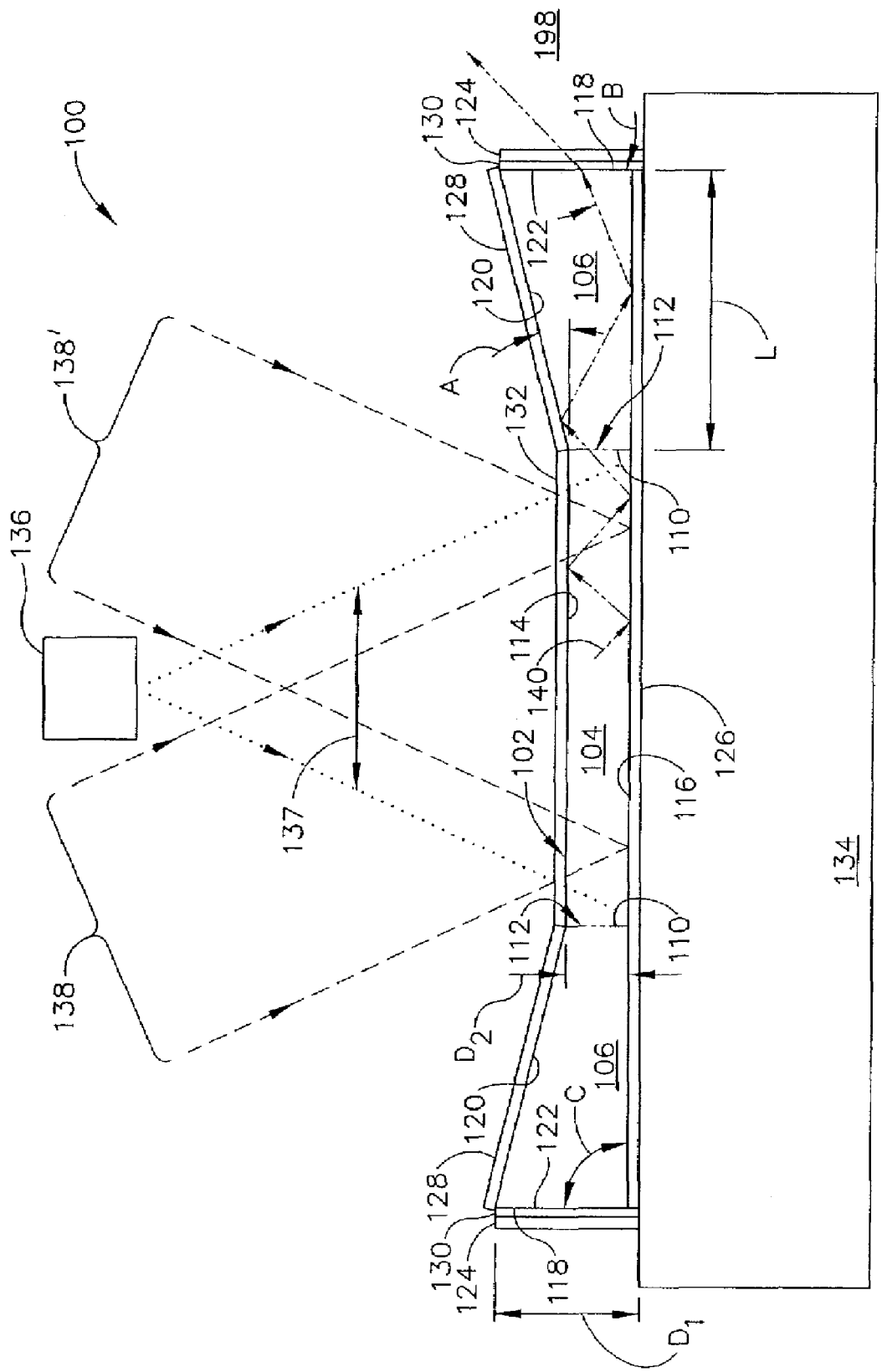
FIG. 1 is a detailed cross-sectional view of a high-gain solid-state laser in accordance with an embodiment of the present invention.

The following detailed description of embodiments refers to the accompanying drawings, which illustrate specific embodiments of the invention. Other embodiments having different structures and operations do not depart from the scope of the present invention.

The following terms and definitions are provided in describing the present invention and the improvements provided thereby.

"Laser gain medium" or "LGM" may refer to an optical material having a host lattice doped with suitable ions, which may be pumped by an external source of laser or other optical radiation to a laser transition. Examples of host lattice material that may be used in conjunction with the present invention may include yttrium aluminum garnet (YAG), gadolinium gallium garnet (GGG), gadolinium scandium gallium garnet (GSGG), lithium yttrium fluoride (YLF), yttrium vanadate, phosphate laser glass, silicate laser glass, sapphire or similar materials. The host material may be in a single crystal form or in a poly-crystalline (ceramic) form. Suitable dopants for such lasing mediums may include titanium (Ti), copper (Cu), cobalt (Co), nickel (Ni), chromium (Cr), cesium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), and ytterbium (Yb). Optical pump sources may be selected based on the absorption characteristics of the selected laser gain medium. For example, semiconductor diode lasers may be used for the optical pump source. The present invention is not intended to be limited to any specific lasing or laser gain material, or a specific pump source.

"Undoped optical medium" may refer to an optical material which is preferably substantially free of any substances that can absorb optical pump radiation. The undoped medium may be of the same host material as the laser gain medium but substantially not doped. In some embodiments of the present invention, however, undoped optical medium may be slightly doped with ions which may absorb optical radiation at the wavelengths of the optical pump and/or the laser gain transition, but are not pumped to a population inversion. Undoped optical medium may be bonded to selected surfaces of the laser gain medium by a fusion bond, or diffusion bond, or other suitable means. Such bonds must be highly transparent at the laser wavelength as well as pump wavelengths. A refractive index of the undoped optical medium and the bond are preferably closely matched to that of the laser gain medium. A suitable bond can be produced by fusion bonding, diffusion bonding, or optical contacting followed by heat treatment. Examples of optical contacting followed by heat treatment are described in the U.S. Pat. Nos. 5,441,803, 5,563,899, and 5,846,638 by Helmuth Meissner. Optical medium of this type may be obtained from Onyx Optics in Dublin, Calif. If the host medium is optical glass, doped and undoped sections may be readily attached by fusion bonding produced by casting. This process is available from Kigre Inc. in Hilton Head, S.C. If the host material is in ceramic form, such bond may be produced during a sintering process. An example of such a process is available from Konoshima Chemical Company LTD of Kagawa, Japan.

"ASE absorption cladding" may refer to an optical material capable of absorbing optical radiation at the wavelengths of one or more laser transitions in the laser gain medium. Examples of ASE absorption materials may include glass (such as phosphate glass, silicate glass, fluorophosphate glass), crystals, ceramics, RTV rubber, epoxy polymers, laminates of these materials or similar materials. These materials may be also doped with absorbing ions. For example, ions which absorb radiation at about 1.06 micrometers are primarily $Cu^{2+}$, $Sm^{3+}$, $Dy^{3+}$, $Cr^{4+}$, and $V^{3+}.Cu^{2+}$. For example, ASE absorption claddings based on polymeric compounds attached to laser gain medium with adhesives is disclosed in U.S. Pat. No. 4,849,036 entitled "Composite Polymer-Glass Edge Cladding for Laser Disks" by Powell et al. ASE absorption cladding preferably has a refractive index closely matched to that of the laser medium to prevent reflection from an edge-cladding interface. In addition, ASE absorption cladding preferably has a coefficient of thermal expansion closely matched to that of the laser gain medium to reduce thermal stresses. ASE absorption cladding may be bonded to selected surfaces of the laser gain medium by an adhesive, fusion bond, diffusion bond, optical contacting followed by heat treatment similar to that described above with respect to the patent by Meissner, or other suitable methods, such as the glass casting process available from Kigre and the sintering process from Konoshima previously discussed. Such bond is preferably highly transparent at the laser wavelength and with a refractive index closely matched to that of the laser gain medium.

"ASE absorption coating" may refer to a thin film bonded onto selected surfaces of the laser gain medium and/or undoped optical medium and having the capability to absorb optical radiation at the wavelengths of one or more laser transitions in the laser gain medium. Such a thin film may be a combination of materials which may have indices of refraction which are greater than the index of refraction of the laser gain medium. Examples of materials may include germanium, silicon, gold, silver, silica, diamond, graphite, dried graphite ink, and some semiconductors and halides. An ASE absorption coating may be produced and applied in accordance with U.S. Pat. No. 5,335,237 entitled "Parasitic Oscillation Suppression in Solid State Lasers Using Absorbing Thin Films" by Zapata et al.

"Composite LGM" may refer to an assembly comprising at least one component made of laser gain medium material, and at least one component made of a group that may include the following materials: 1) an undoped optical medium, 2) an ASE absorption cladding, and 3) an ASE absorption coating. In addition, the gain medium assembly may have reflective, antireflective, and/or dichroic coatings as appropriate for operation as an amplifier of laser radiation.

"Optical aperture" may refer to a maximum transverse dimension of a laser beam, which can be received, amplified, and transmitted by LGM. The term "aperture" used herein may be synonymous to the one used in optics, such as the diameter of the objective of a telescope or other optical instrument.

"Diode bar" may refer to a source of optical radiation suitable for pumping a laser gain medium to a laser transition comprising a 1-dimensional array of semiconductor lasers comprising one or more diodes. The diodes may be mounted in a common substrate and placed on a heat exchanger.

FIG. 1 is a detailed cross-sectional view of a high-gain solid-state laser system 100 in accordance with an embodiment of the present invention. The laser system 100 may include a laser gain medium (LGM) disk, slab or module 102. The LGM module 102 may include a lasing portion 104 and a perimetral portion 106 disposed about a perimeter 110 of the lasing portion 104. The perimeter 110 may each be illustrated by a broken line in FIG. 1 and may define an interface 112 between the lasing portion 104 and the perimetral portion 106. The perimeter 110 may be substantially circular, elliptical, square, rectangular, polygonal or other shape and substantially bounded by the perimetral portion 106. The lasing portion 104 may be a generally flat member or slab formed by two substantially planar mutually parallel surfaces 114 and 116. As shown in FIG. 1, the parallel surfaces 114 and 116 may each contact and be bounded by the perimetral portion 106.

The perimetral portion 106 may be substantially wedge shaped and may include an outer perimetral edge 118. The outer perimetral edge 118 may be substantially opposite to or concentric with the interface 112 between the lasing portion 104 and perimetral portion 106. The outer perimetral edge 118 may have a dimension "$D_1$" and therefore an area greater than a dimension "$D_2$" and area of the interface 112.

The perimetral portion 106 may also include a surface 120 that may extend from the surface 114 of the lasing portion 104. In other embodiments of the present invention, a surface similar to surface 120 may also extend from the surface 116 of the lasing portion 104, similar to that illustrated in FIG. 2A, or a surface may only slant downwardly from the lasing portion surface 116. The perimetral surface 120 may extend from the lasing portion surface 114 at a predetermined angle "A". The predetermined angle "A" may cause spontaneously emitted photons produced in lasing portion 104 and reflected from the perimetral portion surface 120 to be incident on the outer edge 118 of the perimetral portion 106 at an angle "B" to substantially prevent the photon from being reflected by a surface 122 of the outer perimetral edge 118. Rather the photon will pass through the outer perimetral edge 118 where the photon may be absorbed by ASE absorption cladding or an ASE absorption coating 124. In another embodiment of the present invention, the ASE cladding or absorption coating 124 may not be provided and the photon may pass into open space 198. The perimetral portion 106 may also have a length "L" relative to dimensions "D1" and "D2" to facilitate substantially preventing any photons entering the perimetral portion 106 from returning to the lasing portion 104 but rather to exit the perimetral portion 106 through the outer perimetral edge 118.

The lasing portion 104 and the perimetral portion 106 may be integrally formed from a monolithic slab of laser gain material which may be a preferred method of construction if a yitterbium ion is used for lasing. In another embodiment of the present invention, the lasing portion 104 and perimetral portion 106 may be constructed from different materials as a composite structure. The perimetral portion 106 may be made from an undoped optical medium or ASE cladding material similar to that previously described, or a similar material. In such an embodiment, the perimetral portion 106 may be secured to the lasing portion 104 by diffusion bonding or other suitable technique that will provide optical transmission across the interface 112.

A high-reflectivity (HR) coating 126 may be disposed on the planar surface 116 of the lasing portion 104 and another high-reflective coating 128 may be disposed on surface 120 of the perimetral portion 106. An anti-reflective (AR) coating 130 may be disposed on the outer perimetral edge 118. Another anti-reflective coating 132 may be disposed on the planar surface 114 of the lasing portion 104.

A heat exchanger 134 may be thermally coupled to one side 116 of the lasing portion 104 and perimetral portion 106. The high-reflectivity (HR) coating 126 may be disposed between the planar surface 116 and the heat exchanger 134. The high-reflectivity coating 126 may be attached to the heat exchanger 134 to provide substantially complete thermal communication there between across their mutual surface areas. The attachment may be provided by means of a solder, hydrostatic pressure, thermal conductive joining or other suitable joining material or method. Examples of different methods and materials are described in U.S. Pat. No. 5,553,088, entitled "Laser Amplification System" by Brauch et al. and U.S. Pat. No. 6,339,605, entitled "Active Mirror Amplifier System and Method for High-Average Power Laser System by Vetrovec, assigned to the same assignee as the present invention. These patents are incorporated herein in their entirety by reference.

In other embodiments of the present invention, the system 100 may not include a heat exchanger, such as heat exchanger 134, and the surface 116 may have an anti-reflective coating rather than the high-reflectivity coating 126. In such embodiments or applications, the system may be operated intermittently and the LGM module 102 may be permitted to cool between uses or a gas may be directed over the surfaces 114 and/or 116 as described in U.S. patent application Ser. No. 10/862,887, entitled "Side-Pumped Solid-State Disk Laser for High-Average Power" by Jan Vetrovec, filed Jun. 7, 2004, and assigned to the same assignee as the present invention.

During operation of the laser system 100, laser ions in the lasing portion 104 may be optically pumped to a laser transition by a source 136. The source 136 may be a semiconductor diode pump laser or plurality of diode pump lasers or similar sources to generate radiation for pumping the LGM lasing portion 104. Pump light 137 from the source 136 is directed into the LGM lasing portion 104 where the light 137 is largely absorbed and thereby pumps the lasing ions in the LGM lasing portion 104 to a laser transition and produces optical gains in the lasing portion 104. Accordingly, the LGM module 102 operates as an amplifier of laser radiation. In particular, a laser beam 138 illustrated in FIG. 1 by a broken or dashed line is directed on the lasing portion 104 and passes through the anti-reflective coating 132 into the LGM module 102 where laser beam 138 is amplified. The laser beam 138 at a wavelength of a laser transition of lasing portion 102 is reflected from the high-reflectivity coating 126, passes through the LGM 102 again and is further amplified. The amplified laser beam 138' exists through the anti-reflective coating 132.

Optical pump radiation may be provided to the lasing portion 104 through the surface 114 similar to that illustrated in FIG. 1 and described in U.S. Pat. No. 5,553,088 which is known as "face pumping." In another embodiment, optical pump radiation may be provided via the perimetral edge surface 122 similar to that described in U.S. Pat. No. 6,625,193, entitled "Side-Pumped Active Mirror Solid-State Laser for High-Average Power" by Vetrovec and assigned to the same assignee as the present invention. This method of providing optical pump radiation is known as "edge pumping". Pump radiation absorbed in the LGM module 102 may induce a gain in the lasing portion 104.

At least some of the ions pumped into an excited state in the LGM 102 may decay into a ground state by a process known as spontaneous emission. Spontaneously emitted photons have wavelengths generally close to the lasing wavelength(s) of the LGM 102, but may be emitted in random directions. A significant fraction of spontaneously emitted photons may be trapped by total internal reflection inside the LGM 102. Such trapped spontaneous photons may travel along zigzag paths significant distances through the LGM 102 and multiply through the ASE process as described above. Generally, spontaneously emitted photons traverse the LGM 102 in zigzag-like fashion and progress toward the perimetral portion 106. As an example, a spontaneously emitted photon may follow a zigzag path illustrated by dotted and dashed or chain line 140 in FIG. 1. The spontaneously emitted photon 140 may be amplified by passing through the LGM module 102 resulting in ASE as previously described. The spontaneously emitted photon 140 may eventually enter the perimetral portion 106. The spontaneously emitted photon 140 may be reflected by surfaces 120 and 116 in the perimetral portion 106 and directed to the outer perimetral edge 118. Because of the predetermined angle "A" and length "L" relative to dimensions "D1" and "D2", the photon 140 will be incident upon the outer perimetral edge 118 at the angle "B" that is sufficiently steep relative to the surface 122 of the outer perimetral edge 118 to substantially prevent the photon 128 from being reflected back by the surface 122. Accordingly, a spontaneously emitted photon 140 upon entering the perimetral portion 106 will be internally reflected and incident upon the surface 122 of the outer perimetral edge 118 at a substantially steep angle relative to surface 122 and is, therefore, less likely to be reflected back into LGM 102. The likelihood of back reflection of spontaneously emitted photons may be further reduced by providing the surface 122 with the anti-reflective coating 130. As previously discussed, ASE absorption coatings or claddings 124 may be provided to absorb the photons or the ASE absorption coating 124 may be used by itself without the anti-reflective coating 130. In embodiments without the ASE absorption coating or cladding 124, the photons not reflected are conveyed into open space 198, as previously described.

Figure 2A:
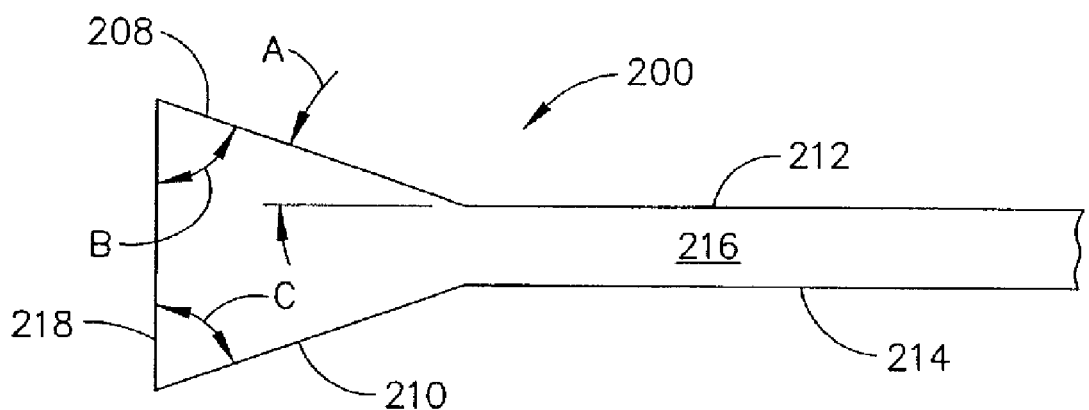
FIGS. 2A-2E are partial side elevation views of examples of perimetral portions each having a different predetermined shape to substantially reduce ASE in accordance with different embodiments of the present invention.

As illustrated in FIG. 1, the outer perimetral edge 118 may be substantially linear in the cross-sectional dimension illustrated and may be oriented at a predetermined angle "C" relative to the planar surface 116 or 114 of the lasing portion 104. The predetermined angle "C" may be between about 80 degrees to about 85 degrees or between about 95 degrees and 100 degrees for the exemplary configuration illustrated in FIG. 1. In other embodiments of the present invention, the outer perimetral edge 118 may be formed in other shapes, such as a circle, an ellipse, a polygon or any form that may facilitate any photons entering the perimetral portion to be incident upon the outer perimetral edge at such an angle relative to a surface of the outer perimetral edge as to not be reflected by the surface and to pass through the edge thereby being prevented from returning to the lasing portion. FIGS. 2A-2E are partial side elevation views of examples of perimetral portions 200-206 each having a different predetermined shape to substantially reduce ASE in accordance with different embodiment of the present invention. In FIG. 2A, the perimetral portion 200 may include two surfaces 208 and 210 that may extend from substantially planar, parallel surfaces 212 and 214 of a lasing portion 216 at a predetermined angle "A" to substantially prevent photons entering the perimetral portion 200 from returning to the lasing portion 216 and to direct the photons to an outer perimetral edge 218. The outer perimetral edge 218 may be at some predetermined angle "B" or "C" relative to surfaces 208 and 210 and offset from being substantially orthogonal to parallel surfaces 212 and 214 to cause any photons to be incident on the outer perimetral edge 218 at such an angle as to pass through the perimetral edge 218 and to not be reflected. For example, the outer perimetral edge 218 may be offset by about 5 to about 10 degrees relative to being orthogonal to parallel surfaces 212 and 214.

Figure 2B:
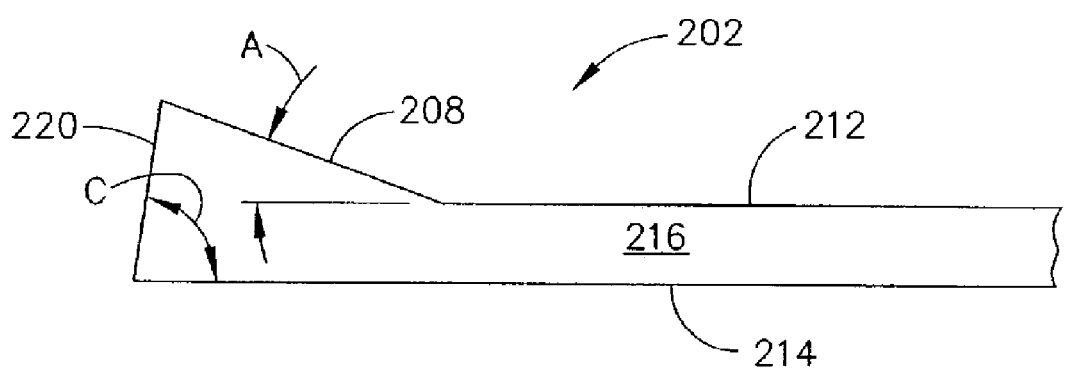

In the embodiment of FIG. 2B, a surface of the perimetral portion 202 may extend straight from the surface 214 of the lasing portion 214. An outer perimetral edge 220 may extend at a predetermined angle "C" from the surface 214. As an example, the predetermined angle "C" may be about 80-85 degrees. Another surface 208 of the perimetral portion 202 may extend at a predetermined angle "A" from the surface 212 of the lasing portion 216 similar to the embodiment of FIG. 1.

Figure 2C:
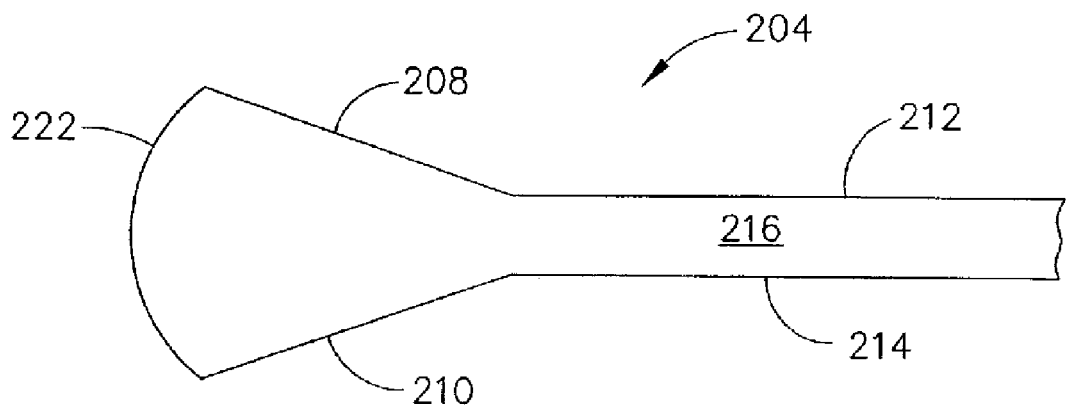

The perimetral portion 204 illustrated in FIG. 2C may be similar to the embodiment of FIG. 2A except that an outer perimetral edge 222 may be substantially circular, elliptical or convex. In the embodiments shown in FIGS. 2A and 2C, a heat exchanger, similar heat exchanger 134 may only contact the lasing portion of the LGM module.

Figure 2D:
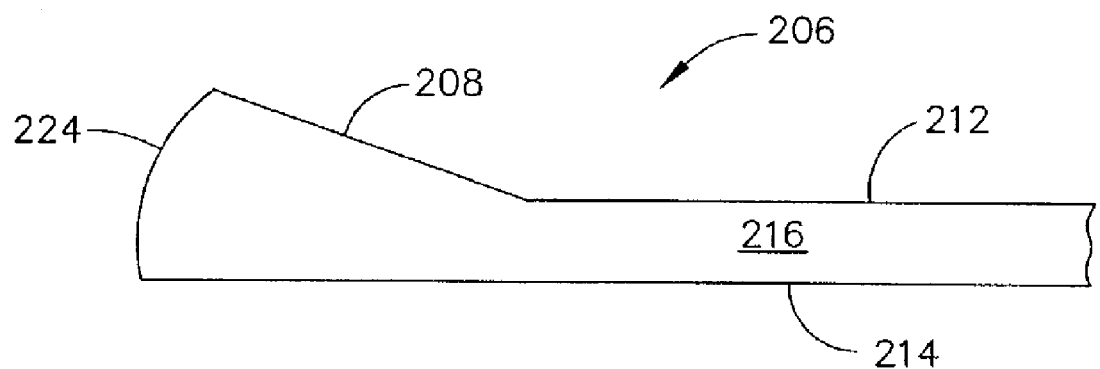

The perimetral portion 206 illustrated in FIG. 2D may be similar to the embodiment of FIG. 2B except that the outer perimetral edge 224 may be substantially convex.

Figure 2E:
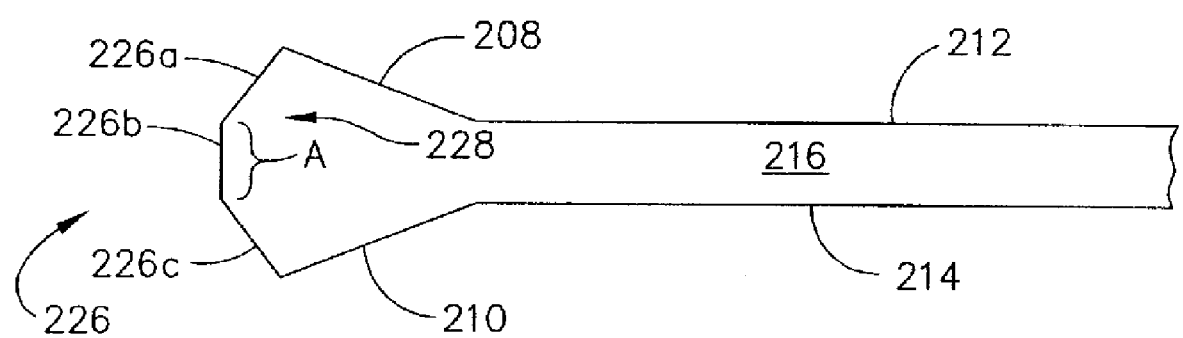

In another embodiment of the present invention illustrated in FIG. 2E, the outer perimetral edge 226 may be multifaceted with a plurality of surfaces 226a-226c or more. Optically, these surfaces form apertures 228 that present cross-sectional areas "A" to the ASE photons from the lasing portion 216.

While the different examples of perimetral portions illustrated in FIGS. 2A-2E may differ, these portions act to control ASE by substantially preventing the return of ASE photons to the lasing region 216 and facilitate the exiting of ASE photons through the perimetral edges.

Figure 3:
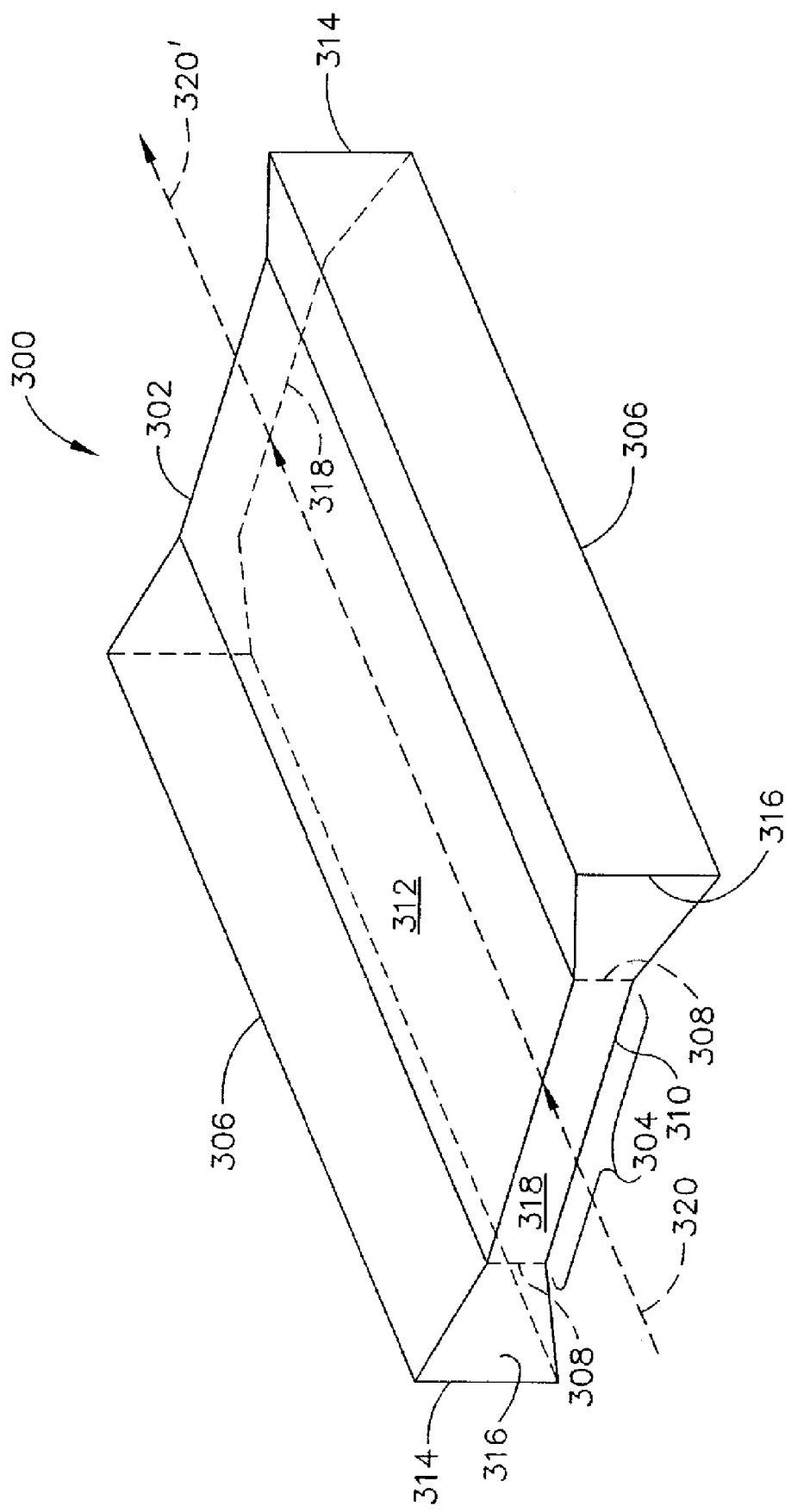
FIG. 3 is a perspective view of a high-gain solid-state laser in accordance with an embodiment of the present invention.

FIG. 3 is a perspective view of a high-gain solid-state laser 300 in accordance with an embodiment of the present invention. The laser 300 may include a LGM slab or module 302. The module 302 may include a lasing portion 304 and a pair of perimetral portions 306 disposed on opposite lateral sides 308 of the lasing portion 304. The lasing portion 304 may be generally a flat member formed by two substantially planar mutually parallel surfaces 310 and 312 joined by lateral sides 308 and laterally bounded by the perimetral portions 306. Each perimetral portion 306 may include an outer perimetral edge 314 and a predetermined shape to cause any spontaneously emitted photons in the perimetral portions 306 to be incident upon the outer perimetral edge 314 at an angle to substantially prevent the photon from being reflected back by a surface 316 of the outer perimetral edge 314.

The perimetral portions 306 may be substantially wedge shaped with a generally rectangular shaped outer perimetral edge surface 316. The LGM module 302 may be constructed from a similar laser gain material as the module 102 of FIG. 1. Accordingly, the LGM module 302 may be a monolithic structure or a composite structure.

The lasing portion 304 and each perimetral portion 306 may define opposite end faces 318 that may be substantially perpendicular to substantially parallel surfaces 310 and 312. Accordingly, a laser beam, illustrated by broken line 320 in FIG. 3, incident upon the end face 318 in a direction generally parallel to planar surfaces 310 and 312 will be amplified in the LGM 302 and exit the LGM 302 as an amplified laser beam 320'. ASE photons traveling in a direction generally transverse to the laser beam 320 and entering one of the perimetral portions 306 may be substantially prevented from being reflected back into the lasing portion 304 similar to that described with respect to FIG. 1.

Figure 4:
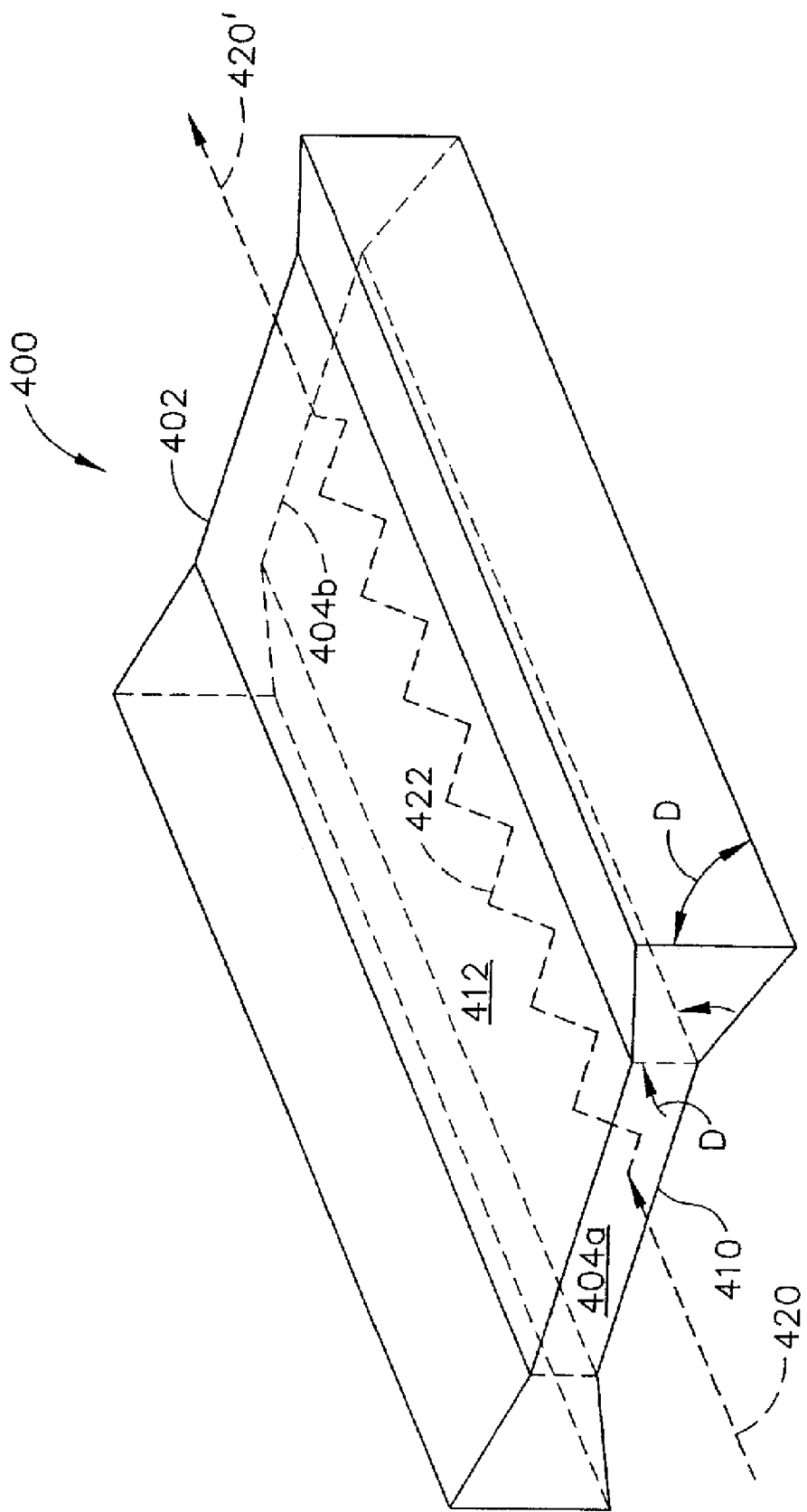
FIG. 4 is a perspective view of a high-gain solid-state laser in accordance with another embodiment of the present invention.

FIG. 4 is a perspective view of a high-gain solid-state laser 400 in accordance with another embodiment of the present invention. The laser 400 may include a LGM slab or module 402 similar to the module 302 of FIG. 3 except the module 402 may include opposite end faces 404 that may be positioned at a selected angle "D" relative to substantially parallel surfaces 410 and 412. At least a first end face 404a may be oriented relative to substantially parallel surfaces 410 and 412 to cause a laser beam 420 entering the LGM module 402 at the first end face 404 to undergo multiple internal reflections between the parallel surfaces 410 and 412 as the laser beam 420 propagates between the opposite end faces 404. The laser beam 420 may follow a zigzag path 422 through the LGM 402 as illustrated by the dashed or broken line in FIG. 4. With each reflection and crossing of the LGM 402 the laser beam 420 may be amplified by the LGM 402 such that an amplified beam 420' exits the opposite end face 404b.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A laser gain material module, comprising:
   a lasing portion; and
   a perimetral portion formed in a predetermined shape to substantially prevent any spontaneously emitted photons created in the lasing portion and entering the perimetral portion from returning to the lasing portion, wherein the laser gain module forms substantially one of a disk and a slab, and wherein an outer perimetral edge of the perimetral portion opposite to the lasing portion is one of open to open space to allow any spontaneously emitted photons to pass from the perimetral portion into the open space and has an ASE cladding or an absorption coating to absorb any spontaneously emitted photons.

2. The laser gain material module of claim 1, wherein the perimetral portion is substantially wedge shaped and comprises an outer perimetral edge substantially opposite to an interface between the lasing portion and the perimetral portion, wherein the outer perimetral edge has an area greater than an area of the interface.

3. The laser gain material module of claim 2, wherein the outer perimetral edge is substantially linear and oriented at a predetermined angle relative to a surface of the lasing portion.

4. The laser gain material module of claim 3, wherein the outer perimetral edge is substantially non-orthogonal to the surface of the lasing portion.

5. The laser gain material module of claim 2, wherein the outer perimetral edge is one of substantially convex and multi-faceted.

6. The laser gain material module of claim 2, further comprising an antireflective coating disposed on the outer perimetral edge.

7. The laser gain material module of claim 2, further comprising a heat exchanger thermally coupled to one side of the lasing portion and the perimetral portion.

8. The laser gain material module of claim 7, further comprising a high-reflectivity coating disposed between the heat exchanger and the one side of the lasing portion and the perimetral portion.

9. The laser gain material module of claim 8, further comprising an anti-reflective coating disposed on another side of the lasing portion and the perimetral portion substantially opposite to the one side.

10. The laser gain material module of claim 8, wherein the high-reflectivity coating is attached to the heat exchanger to provide substantially complete thermal communication between the high-reflectivity coating and the heat exchanger by one of a group comprising solder, hydrostatic pressure and a thermally conductive joining material.

11. The laser gain material module of claim 1, wherein the perimetral portion comprises a surface extending from a surface of the lasing portion at a predetermined angle to cause any spontaneously emitted photons reflected from the perimetral portion surface to be incident upon an outer edge of the perimetral portion at an angle to substantially prevent the photon from being reflected back by a surface of the outer perimetral edge.

12. The laser gain material module of claim 1, wherein the lasing portion and the perimetral portion are integrally formed from a monolithic slab of laser gain material.

13. The laser gain material module of claim 1, wherein the lasing portion and the perimetral portion are formed from different materials.

14. The laser gain material module of claim 13, wherein the perimetral portion is formed from a group comprising at least one of an undoped optical medium, ASE absorption cladding and ASE absorption coating.

15. The laser gain material module of claim 13, wherein the perimetral portion is secured to the lasing portion by one of a group comprising diffusion bonding, a fusion bond, an adhesive, optical contacting followed by heat treatment, a glass casting process and sintering.

16. A laser gain material module, comprising:
a lasing portion; and
a pair of perimetral portions disposed on opposite lateral sides of the lasing portion, wherein each perimetral portion includes:
an outer perimetral edge; and
a predetermined shape to cause any spontaneously emitted photons in the perimetral portion to be incident upon the outer perimetral edge at an angle to substantially prevent the photon from being reflected back by a surface of the outer perimetral edge, and wherein the outer perimetral edge of each perimetral portion opposite to the lasing portion is one of open to open space to allow any spontaneously emitted photons to pass from the perimetral portion into the open space and has an ASE cladding or an absorption coating to absorb any spontaneously emitted photons.

17. The laser gain material module of claim 16, wherein each perimetral portion is substantially wedge shaped and the outer perimetral edge of each perimetral portion has a dimension greater than a dimension of an interface between the perimetral portion and the lasing portion.

18. The laser gain material module of claim 16, wherein each outer perimetral edge is substantially linear and oriented at a predetermined angle relative to a planar surface of the lasing portion.

19. The laser gain material module of claim 16, wherein each outer perimetral edge is one of substantially convex and multifaceted.

20. A laser system, comprising:
a laser gain material module, wherein the laser gain material module comprises:
a lasing portion; and
a perimetral portion formed in a predetermined shape to substantially prevent any spontaneously emitted photons created in the lasing portion and entering the perimetral portion from returning to the lasing portion, wherein an outer perimetral edge of the perimetral portion opposite to the lasing portion is one of open to open space to allow any spontaneously emitted photons to pass from the perimetral portion into the open space and has an ASE cladding or an absorption coating to absorb any spontaneously emitted photons; and
a source to direct optical pump radiation into the lasing portion.

21. The laser system of claim 20, wherein the perimetral portion is substantially wedge shaped and comprises an outer perimetral edge substantially opposite to an interface between the lasing portion and the perimetral portion, wherein the outer perimetral edge has a dimension greater than a dimension of the interface.

22. The laser system of claim 21, wherein the outer perimetral edge is substantially linear and oriented at a predetermined angle relative to a surface of the lasing portion.

23. The laser system of claim 21, wherein the outer perimetral edge is one of substantially convex and multi-faceted.

24. The laser system of claim 21, further comprising an antireflective coating disposed on the outer perimetral edge.

25. The laser system of claim 20, further comprising a heat exchanger thermally coupled to at least one side of the lasing portion.

26. A method to substantially reduce amplified spontaneous emission, comprising providing a perimetral portion formed in a predetermined shape to substantially prevent any spontaneously emitted photons entering the perimetral portion from returning to or entering a lasing portion, wherein an outer perimetral edge of the perimetral portion opposite to the lasing portion is one of open to open space to allow any spontaneously emitted photons to pass from the perimetral portion into the open space and has an ASE cladding or an absorption coating to absorb any spontaneously emitted photons.

27. The method of claim 26, wherein providing the perimetral portion comprises providing a substantially wedge shaped perimetral portion including an outer perimetral edge formed substantially opposite to an interface between the lasing portion and the perimetral portion, wherein the outer perimetral edge has a dimension greater than a dimension of the interface.

28. The method of claim 27, further comprising forming the outer perimetral edge to be substantially linear and oriented at predetermined angle relative to a surface of the lasing portion.

29. The method of claim 27, further comprising forming the outer perimetral edge to be one of substantially convex and multi-faceted.

30. The method of claim 27, further comprising disposing an antireflective coating on the outer perimetral edge.

* * * * *